US009268476B2

(12) United States Patent
Hoyer (10) Patent No.: US 9,268,476 B2
(45) Date of Patent: Feb. 23, 2016

(54) DRAG AND DROP INTERACTION PARADIGM WITH IMAGE SWAP

(75) Inventor: Timo Hoyer, Mountain View, CA (US)

(73) Assignee: SAP SE, Walldorf (DE)

( * ) Notice: Subject to any disclaimer, the term of this patent is extended or adjusted under 35 U.S.C. 154(b) by 118 days.

(21) Appl. No.: 13/461,993

(22) Filed: May 2, 2012

(65) Prior Publication Data
US 2013/0298060 A1 Nov. 7, 2013

(51) Int. Cl.
*G06F 3/0486* (2013.01)
(52) U.S. Cl.
CPC ................... *G06F 3/0486* (2013.01)
(58) Field of Classification Search
CPC .......... G06F 3/04815; G06F 17/30297; G06F 17/30581; G06F 3/065; G06F 3/0486; H04L 67/1095
USPC .......................................................... 715/769
See application file for complete search history.

(56) References Cited

U.S. PATENT DOCUMENTS

| | | | |
|---|---|---|---|
| 5,040,131 A * | 8/1991 | Torres ........................... 715/810 |
| 5,923,327 A * | 7/1999 | Smith et al. ................... 715/784 |
| 7,634,733 B2 * | 12/2009 | Sadikali et al. ............... 715/738 |
| 8,051,382 B1 * | 11/2011 | Kingdom et al. ............. 715/769 |
| 2004/0027382 A1 * | 2/2004 | Kuehn ..................... G06F 9/543 715/769 |
| 2005/0223329 A1 * | 10/2005 | Schwartz et al. ............. 715/711 |
| 2006/0041615 A1 * | 2/2006 | Blank et al. .................... 709/204 |
| 2006/0204133 A1 * | 9/2006 | Florence ............. G06F 3/04817 382/284 |
| 2010/0313156 A1 * | 12/2010 | Louch et al. .................. 715/769 |
| 2011/0185300 A1 * | 7/2011 | Hinckley ............. G06F 3/03545 715/769 |
| 2012/0169768 A1 * | 7/2012 | Roth et al. ..................... 345/629 |

* cited by examiner

*Primary Examiner* — Jennifer To
*Assistant Examiner* — Terri Filosi
(74) *Attorney, Agent, or Firm* — Kenyon & Kenyon LLP (57) ABSTRACT

A software application assists users of a computing device to manipulate a data object displayed on a user interface. The software application may be implemented as a method that may comprise receiving a touch-and-hold operation directed to the data object, and responsive to the touch-and-hold operation, determining whether a time period since beginning of the touch-and-hold operation reaches a predetermined threshold value, when the time period reaches the predetermined threshold value, creating an image of the data object and hovering the image of the data object on top of the data object to indicate it is draggable, and responsive to the image of the data object being dragged into a droppable display area on the user interface, swapping the image of the data object with a user guidance indicating what the image of the data object will look like if released in the droppable display area.

21 Claims, 8 Drawing Sheets

DRAG AND DROP INTERACTION PARADIGM WITH IMAGE SWAP

BACKGROUND

The present invention relates to showing of resources in a computer system and, in particular, to a computing device that automatically displays a guidance when an object is dragged in a display to a droppable area.

Modern businesses use networked computer systems in many facets of their operation to simplify and streamline business processes. SAP AG markets several applications to assist businesses in their knowledge management functions, human resources management functions, customer relationship management functions, and supply chain management functions (among others). In a lot of these applications, the user wants to get both an overview of a hierarchical structure of some data objects in icons or thumbnail views and a detailed view of each object profile. For example, in a human resource application, a typical user normally wants to get an overview of the organizational structures of different units with their respective employees, and when he/she wants, a detailed view of those employees' profiles. The employee profile information like work history and compensation data are displayed when the user wants to review any employee in detail. Thus, the user has to have the option to access those profiles easily. An interaction has to be available to deliver this access right on the fingertips as it is expected on a variety of display devices, such as a desk top computer and/or a tablet device with a touch display.

However, in existing applications, there is normally no guidance to the user when the user operates on the icons or thumbnail views to let the user know that a data object displayed in the user interface can be dragged and/or what happens if the user drags and drops the data object to a certain area. That is, the user is not given any hint as to what will happen, what an exploded view will look like, and/or where the object can be dropped to. Accordingly, there is a need in the art for a computing device that automatically displays a guidance when an object is dragged in a user interface to a droppable area.

DETAILED DESCRIPTION

Embodiments of the present invention may work in a computer system to facilitate displaying and manipulating data objects displayed on computing devices. In one embodiment, a software application may assist users of a computing device to manipulate a data object displayed on a user interface. The software application may be implemented as a method that may comprise receiving a touch-and-hold operation directed to the data object, and responsive to a touch-and-hold operation directed to the data object, determining whether a time period since beginning of the touch-and-hold operation reaches a predetermined threshold value. The method may further comprise creating an image of the data object and hovering the image of the data object on top of the data object to indicate it is draggable when the time period reaches the predetermined threshold value. Moreover, the method may comprise, responsive to the image of the data object being dragged into a droppable display area on the user interface, swapping the image of the data object with a user guidance indicating what the image of the data object will look like if released in the droppable display area. The principles of the present invention may be applied in different types of computing devices and different computer applications that displays data objects on user interfaces.

Figure 1:
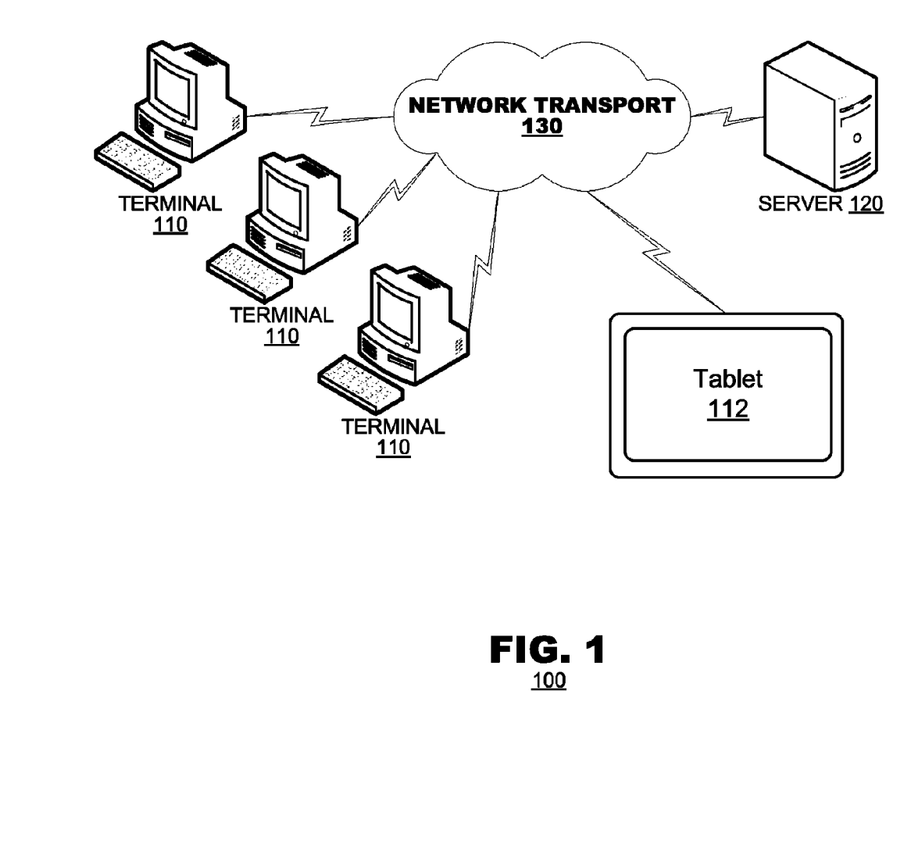
FIG. 1 is a simplified block diagram of a computer network suitable for use with the present invention.

FIG. 1 is a simplified block diagram of a computer system 100 suitable for use with the present invention. The system 100 may include a number of terminals 110 and at least one tablet computing device 112 connected to one or more servers 120 via a network 130. The terminals 110, the at least one tablet computing device 112 and servers 120 collectively execute a number of applications, which include executable code and various data sets. For example, the server 120 may store data to be provided to various applications running at the server 120, the terminals 110 and the at least one tablet computing device 112. Various users also may view and operate on common, shared data during execution of various applications but this functionality is not shown in FIG. 1. The present discussion focuses on presenting guidance for dragging data objects that are displayed on a display screen.

As noted, FIG. 1 is a simplified block diagram of a computer system 100. Unless noted otherwise, the topology and architecture of the system 100 is immaterial to the present discussion unless otherwise noted.

Figure 2:
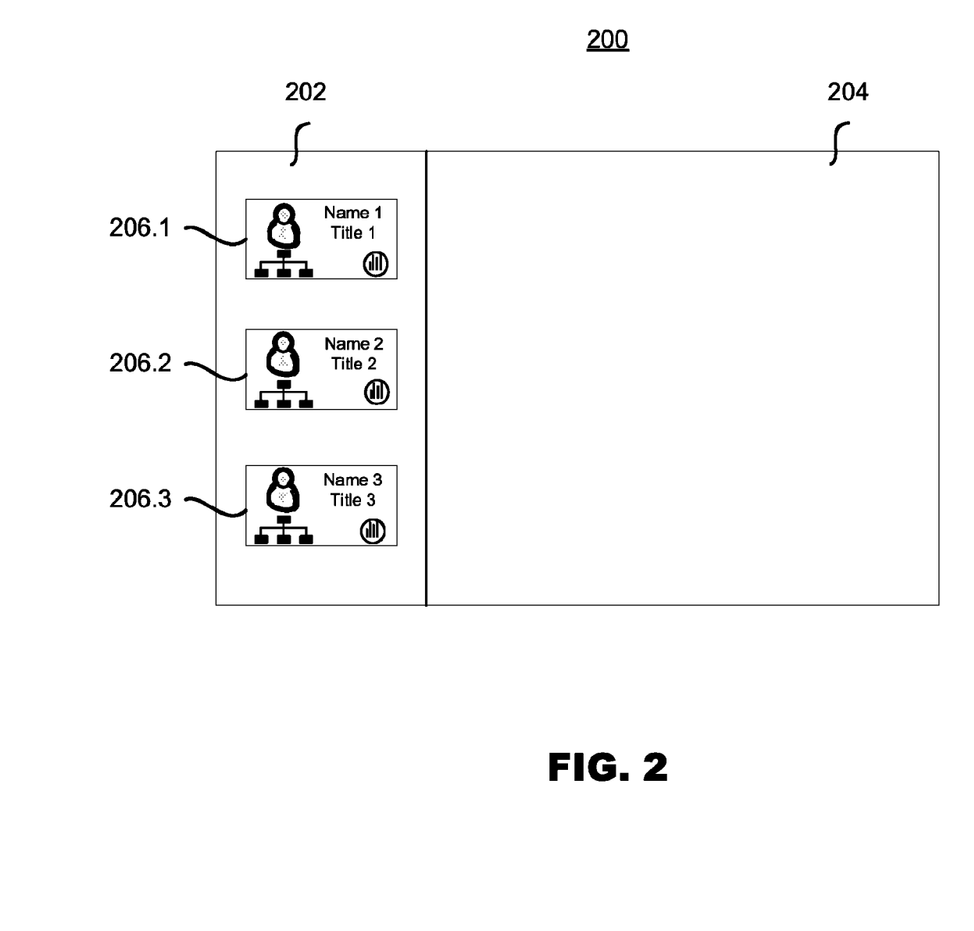
FIGS. 2-6 are screen shots illustrating operation of embodiments of the present invention.

FIG. 2 is a screen shot of a user interface 200 for use in a Human Resource Management application. There, the user interface 200 presents a plurality of business cards for employees (e.g., data objects) 206.1~206.3 in a first display area 202. The user interface also includes a second display area 204. In one embodiment, each business card 206.1~206.3 may be presented in a compact size (e.g., an icon or thumbnail view). As shown in FIG. 2, each business card 206.1~206.3 may show an employee name and title, and a few command buttons for further exploration of the employee's situation. For example, a "hierarchy" button and a "chart" button may be provided. If the "hierarchy" button is clicked, organizational information about the respective employee, such as, the employee's position in the company, who reports to the employee and whom the employee reports to, and who are the employee's team members, etc, may be displayed (e.g., in the second display area 204). If the "chart" button is clicked, the respective employee's performance reports may be displayed (e.g., in the second display area 204).

Figure 3:
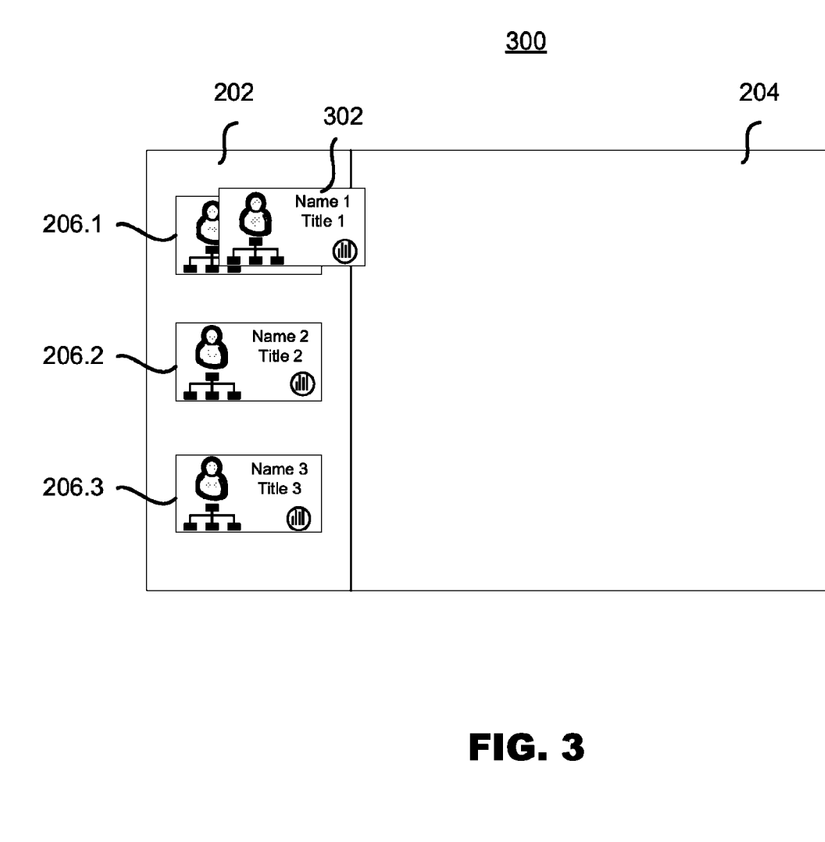

In one embodiment, each business card 206.1~206.3 may be dragged from the first display area 202 and dropped to the display area 204. FIG. 3 illustrates a user interface 300 that shows the user interface 200 of FIG. 2 as the business card 206.1 indicating that it may be dragged. The user interface 300 may be a touch-screen on a tablet computing device (e.g., the tablet computing device 112) or a desktop computing device (e.g., a terminal 110).

Figure 4:
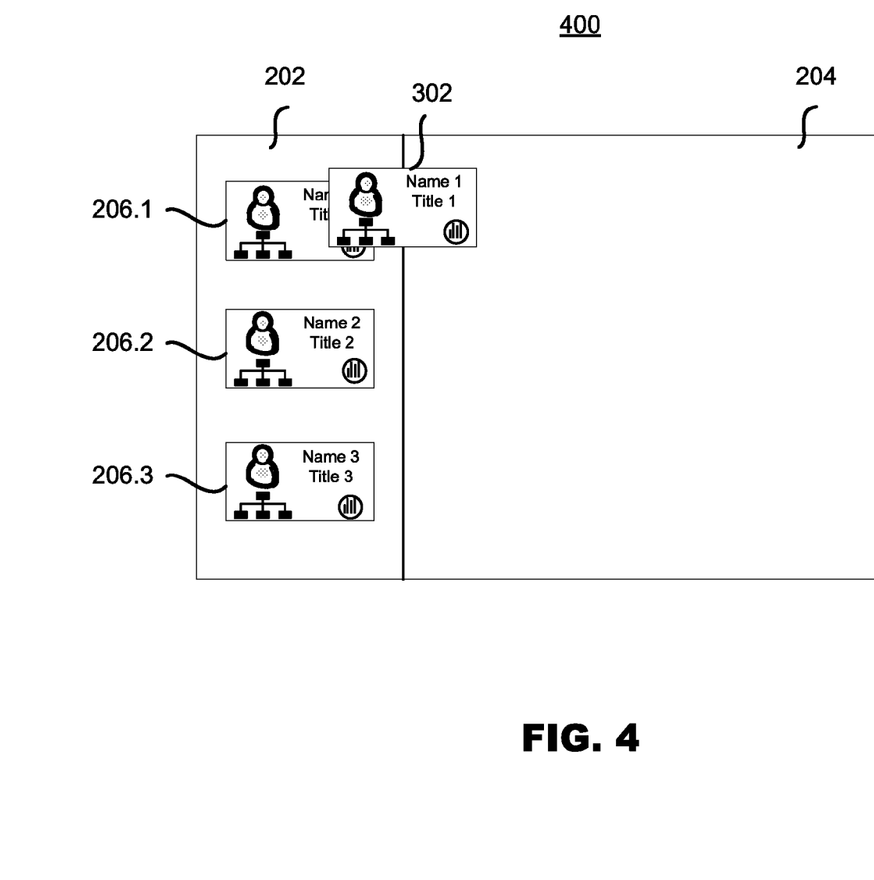

In the user interface 200, any displayed objects may indicate whether it may be draggable. In one embodiment, any displayed objects that may be draggable may be lifted up after a predetermined time when it receives a touch-and-hold command (e.g., a finger touches and holds on a particular displayed object, or a button click on a mouse and holds the button corresponding to a particular displayed object). For example, after a user touch-and-holds the business card 206.1 after 0.5 seconds, a business card 302, which may be an image of the business card 206.1, may be created and may hover over the business card 206.1 to indicate this business card 206.1 may be draggable. FIG. 4 shows that the business card 302 may be dragged around on the user interface 200 according to one embodiment.

Figure 5:
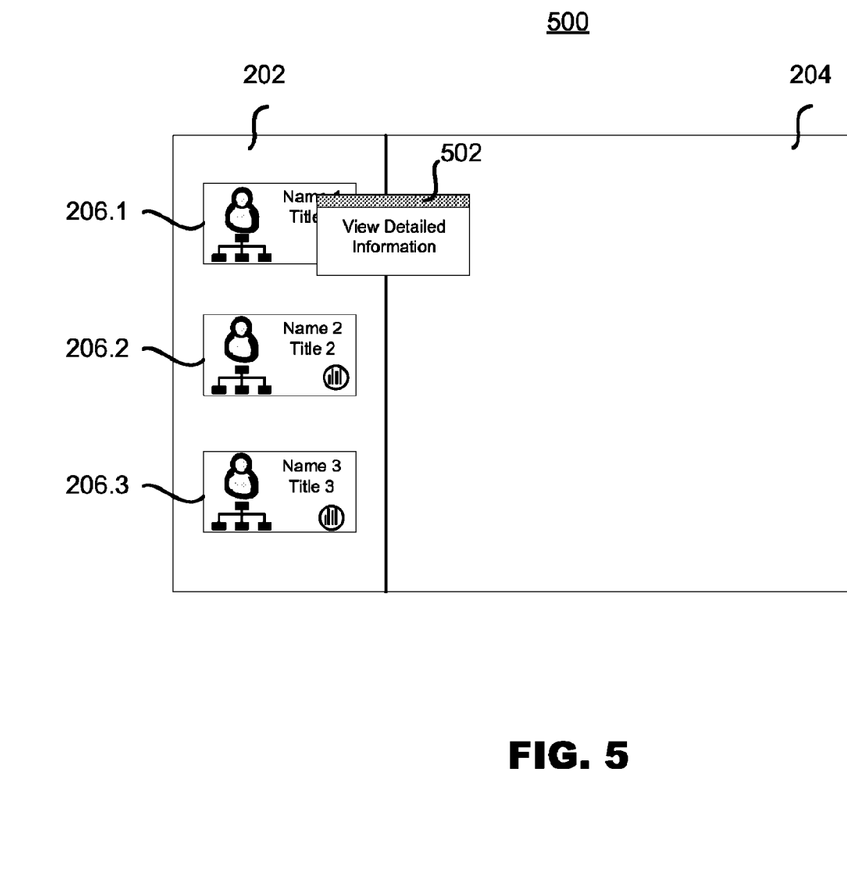

FIG. 5 illustrates a user interface 500 according to one embodiment. The user interface 500 may be a user interface 200 with a guidance card 502 indicating that it may be dropped. As noted above, the business card 302 may be dragged around. Once it enters a droppable area, such as the second display area 204, business card 302 may transform into the guidance card 502. In one embodiment, the guidance card 502 may include a smaller version of the detailed information that is going to show up when the guidance card 502 may be dropped in the second display area 204 (e.g., the touching finger or clicking button may be released).

In one embodiment, the transformation may be an image swap to be performed on the fly. That is, the transformation may occur instantly as soon as the object is being dragged over the droppable area. Further, the transformation may be performed when a certain portion (e.g., ⅓, ½, ⅔, etc.) of the guidance card 502 may be dragged over the droppable area 204. The guidance card 502 may provide a guidance, for example, a small profile that says "View Employee Profile," to the user.

Figure 6:
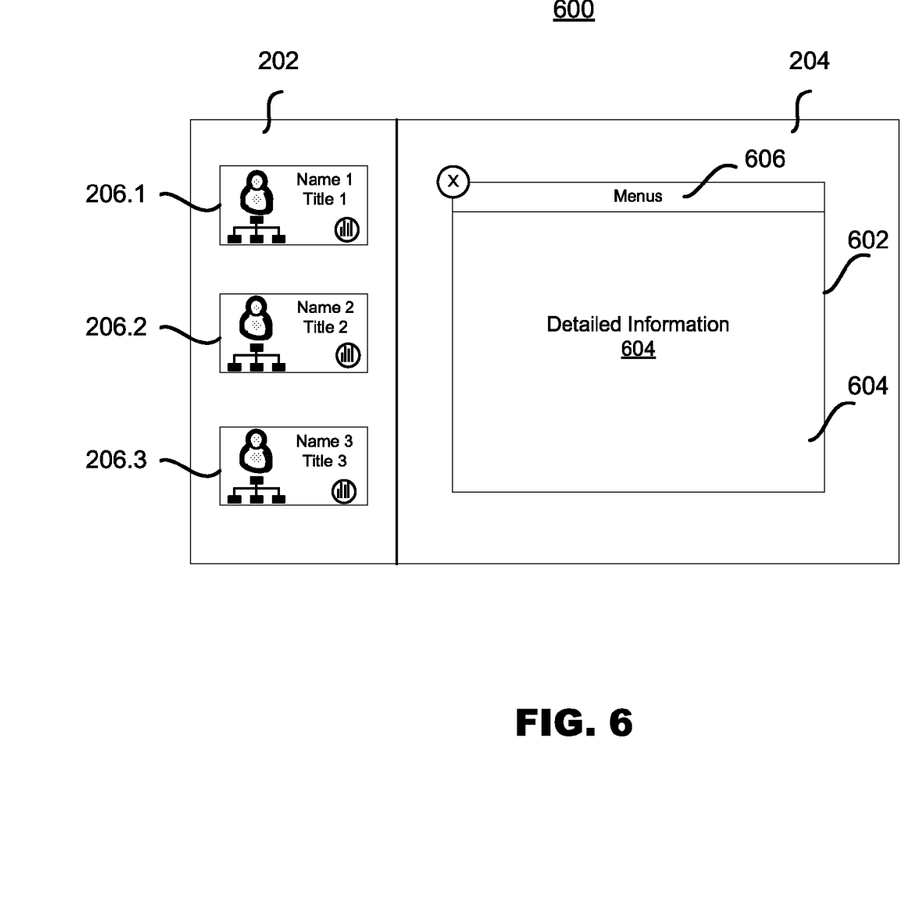

FIG. 6 illustrates a user interface 600 according to one embodiment. The user interface 600 may be a user interface 200 with a detailed profile card 602 displayed in the second display area 204. The detailed profile card 602 may include a menu bar 606 that may have a plurality of menus (e.g., texts or icons) and a detailed information display 604. In one embodiment, the detailed profile card 602 may be dragged back to the first display area 202. During the drag back operation, the detailed profiled card 602 may change back to the prior shape of a business card (e.g., the business card 302).

Embodiments of the present invention may differ from conventional user interface applications because the conventional user interface only focuses on the drop zone instead of the object being dragged. In embodiments of the present invention, the data object may be manipulated directly and the user instantly feels the change. For example, the user may feel the change underneath their fingertip while dragging it. This may give the user a different experience than operating with a cursor on a monitor because the change can be experienced directly with no peripherals (e.g., mouse and keyboard) for the human computer interaction. Also, because the image swap may be performed instantly when the object is dragged over the droppable area, this may be different from the image swapping that occurs after some seconds of being in the droppable area or different from changing the image after lifting it up from the origin position but before being dragged to the droppable area.

Further, the Human Resource Management application may be an example because embodiments of the present invention may be any software application that has draggable displayed data objects to be displayed in different viewing areas in different levels of details.

Figure 7:
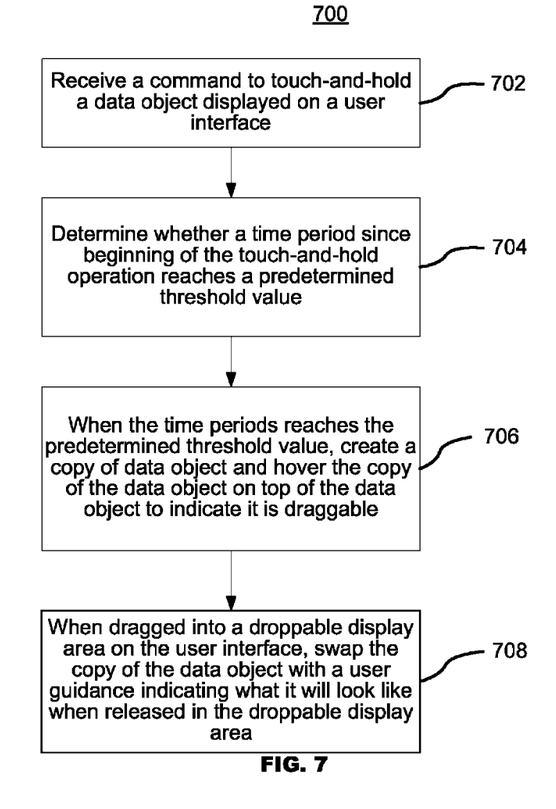
FIG. 7 illustrates a process to provide a visual guidance according to an embodiment of the present invention.

FIG. 7 illustrates a process 700 to display and manipulate data objects displayed on computing devices according to an embodiment of the present invention. At block 702, a command to touch and hold (e.g., touch-and-hold) a data object displayed on a user interface may be received. In one embodiment, the display device may be a tablet computing device with a touch-screen display, the touch-and-hold operation may be a user putting a finger on the data object and holding it. In another embodiment, the display device may be a monitor without touch-screen functionalities, the touch-and-hold operation may be a user pushing down a button on the data object and hold the button down. At block 704, whether a time period since beginning of the touch-and-hold operation reaches a predetermined threshold value may be determined. For example, on a tablet computing device with a touch screen, the predetermined threshold value may be 0.5 seconds. At block 706, when the time period reaches the predetermined threshold value, an image of the data object may be created and the image of the data object may be hovered on top of the data object to indicate that it is draggable. In one embodiment, the image of the data object may be shown as if it may be lifted up from the data object. At block 708, responsive to the image of the data object being dragged into a droppable display area on the user interface, the image of the data object may be swapped with a user guidance that may indicate what the image of the data object will look like if it is released in the droppable display area. As noted above, in one embodiment, when the data object being dragged is a business card of a person, the user guidance may be a smaller version of a full view of a user profile for that person.

Figure 8:
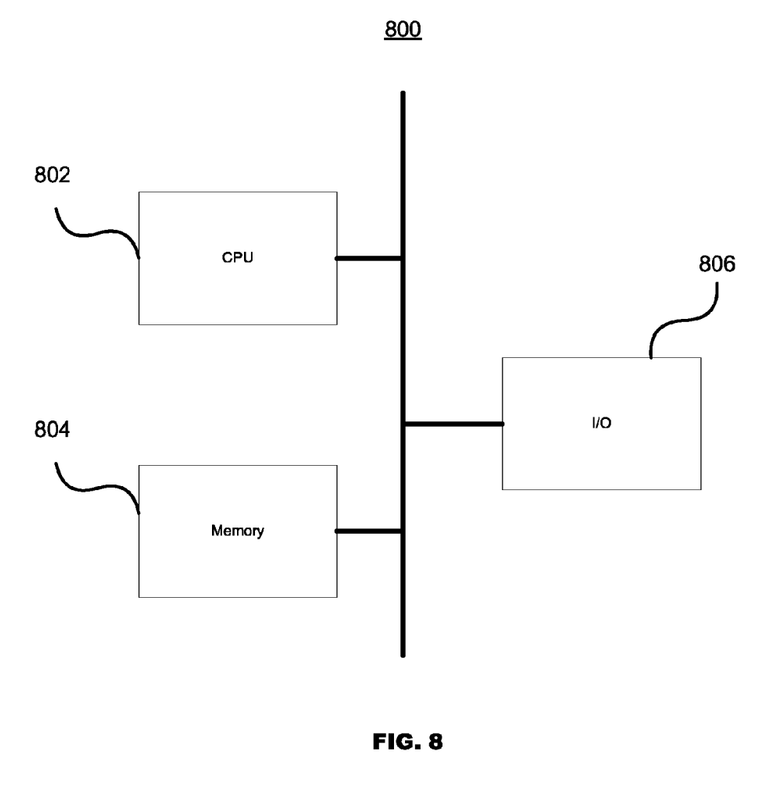
FIG. 8 illustrates a computer system according to an embodiment of the present invention.

FIG. 8 illustrates a computer system 800 according to an embodiment of the present invention. The computer system 800 may represent an embodiment of the server 120, terminal 110 and the tablet computing device 112. The computer system 800 includes a processor 802, memory 804, and an I/O device(s) 806. The processor 802 is connected to the memory 804 and I/O device(s) 806. These connections are direct or via other internal electronic circuitry or components.

The processor 802 is a programmable processor that executes instructions residing in the memory 804 to receive and send data via the I/O device(s) 806. The instructions may perform the operations of a message handling system according to an exemplary embodiment. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention processor 802 is an Intel® microprocessor.

Memory 804 is a machine-readable medium that stores data that is processed by processor 802. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 802 via one or more I/O device(s) 806.

The I/O device(s) 806 may be one or more input/output interfaces that receive and/or send digital data to and from an external device. Interfaces as used herein are any point of access to an external device where digital data is received or sent, including ports, buffers, queues, subsets thereof, or any other interface to an external device.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

I claim:

1. A method of manipulating a data object displayed on a user interface of a computing device, comprising:
   receiving a touch-and-hold operation directed to a first image of the data object;
   determining whether a time period since beginning of the touch-and-hold operation reaches a predetermined threshold value;
   when the time period reaches the predetermined threshold value, indicating that the data object is draggable by:
      creating a second image of the data object; and
      hovering the second image of the data object on top of the first image of the data object wherein the first image of the data object is at least partially viewable during the hovering; and
   responsive to the second image of the data object being dragged into a droppable display area on the user interface, swapping the second image of the data object with a guidance user interface element, the guidance user interface element including at least one menu bar and additional information about the data object.

2. The method of claim 1, wherein the computing device is a touch-screen device.

3. The method of claim 2, wherein the touch-screen device is a tablet device.

4. The method of claim 1, wherein after the second image of the data object is dropped in the droppable display area, displaying a full view of the data object.

5. The method of claim 4, wherein:
   the data object is a business card;
   the additional information about the data object includes profile details of the business card; and
   the full view of the business card includes a full view of a user profile, including the additional information about the data object.

6. The method of claim 4, wherein when the full view of the data object is dragged to leave the droppable display area, the full view of the data object changes into the image of the data object.

7. The method of claim 1, wherein the guidance user interface element indicates what the second image of the data object will look like if released and the additional information about the data object includes profile details of the data object.

8. A computing device, comprising:
   storage for computer program instructions,
   a display device, and
   a computer processor configured to execute the computer instructions to:
      receive a touch-and-hold operation directed to a first image of a data object;
      determine whether a time period since beginning of the touch-and-hold operation reaches a predetermined threshold value,
      when the time period reaches the predetermined threshold value, indicate that the data object is draggable by creating a second image of the data object and hovering the second image of the data object on top of the first image of the data object wherein the first image of the data object is at least partially viewable during the hovering; and
      responsive to the second image of the data object being dragged into a droppable display area on the user interface, swap the second image of the data object with a guidance user interface element, the guidance user interface element including at least one menu bar and additional information about the data object.

9. The computing device of claim 8, wherein the computing device is a touch-screen device.

10. The computing device of claim 9, wherein the touch-screen device is a tablet device.

11. The computing device of claim 8, wherein after the second image of the data object is dropped in the droppable display area, display a full view of the data object.

12. The computing device of claim 11, wherein the data object is a user business card and the full view of the data object is a full view of a user profile.

13. The computing device of claim 11, wherein when the full view of the data object is dragged to leave the droppable display area, the full view of the data object changes into the image of the data object.

14. A non-transitory computer readable storage medium having stored thereon computer instructions that, when executed by a computing device, cause the computing device to:
   receive a touch-and-hold operation directed to a first image of a data object;
   determine whether a time period since beginning of the touch-and-hold operation reaches a predetermined threshold value,
   when the time period reaches the predetermined threshold value, indicate that the data object is draggable by creating a second image of the data object and hovering the second image of the data object on top of the first image of the data object wherein the first image of the data object is at least partially viewable during the hovering; and
   responsive to the second image of the data object being dragged into a droppable display area on the user interface, swap the second image of the data object with a guidance user interface element, the guidance user interface element including at least one menu bar and additional information about the data object.

15. The computer readable storage medium of claim 14, wherein the computing device is a touch-screen device.

16. The computer readable storage medium of claim 15, wherein the touch-screen device is a tablet device.

17. The computer readable storage medium of claim 14, wherein after the second image of the data object is dropped in the droppable display area, display a full view of the data object.

18. The computer readable storage medium of claim 17, wherein the data object is a user business card and the full view of the data object is a full view of a user profile.

19. The computer readable storage medium of claim 17, wherein when the full view of the data object is dragged to leave the droppable display area, the full view of the data object changes into the image of the data object.

20. A method of manipulating a data object displayed on a user interface of a computing device, comprising:
 receiving a touch-and-hold operation directed to a first image of the data object, wherein the computing device is a touch-screen device and the touch-and hold operation including touching and holding the data object on the touch-screen device by a user's operation;
 determining whether a time period since beginning of the touch-and-hold operation reaches a predetermined threshold value;
 when the time period reaches the predetermined threshold value, indicating that the data object is draggable by:
  creating a second image of the data object; and
  hovering the second image of the data object on top of the first image of the data object wherein the first image of the data object is at least partially viewable during the hovering; and
 responsive to the second image of the data object being dragged into a droppable display area on the user interface, swapping the second image of the data object with a guidance user interface element, the guidance user interface element including at least one menu bar and additional information about the data object; and
 displaying a full view of the data object after the image of the data object is dropped in the droppable display area.

21. The method of claim 20, further comprising:
 changing the full view of the data object changes into the image of the data object when the full view of the data object is dragged to leave the droppable display area.

* * * * *